12
United States Patent Office 3,185,529
Patented May 25, 1965

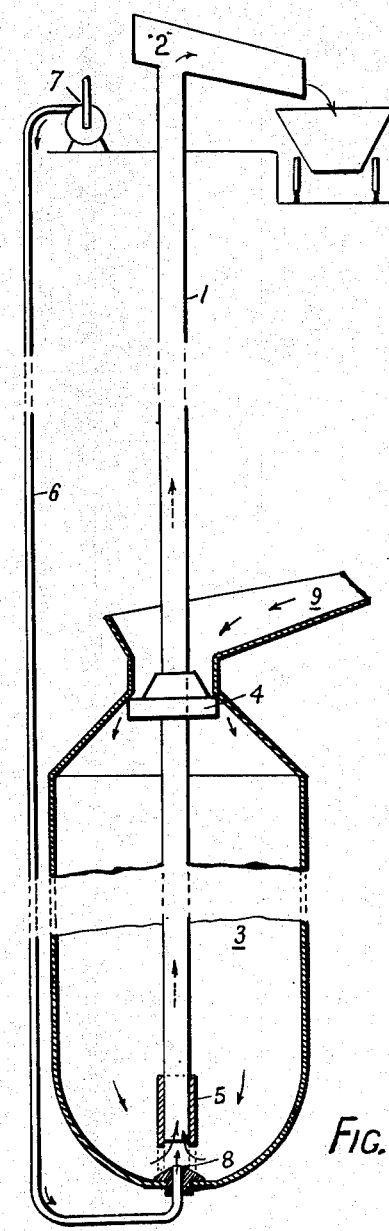
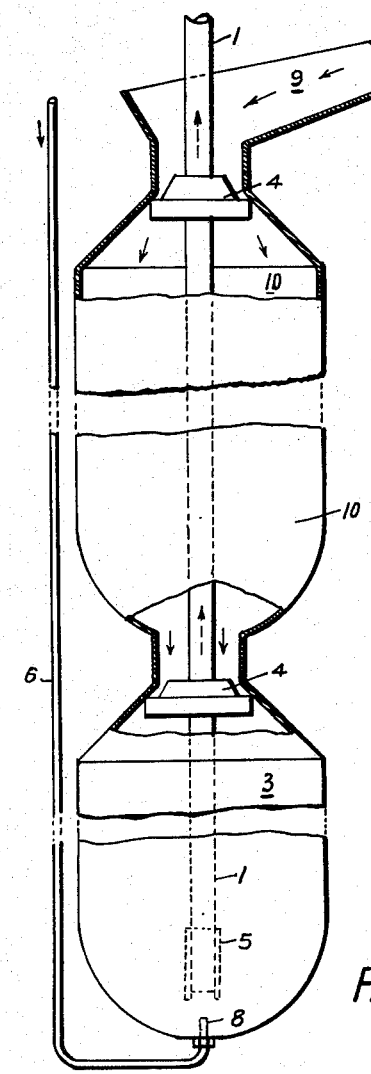
FIG.1.
FIG.2.

3,185,529
APPARATUS FOR HYDRAULICALLY CONVEYING DISCRETE SOLIDS
Derec Fay Vaughan Davies, Edgecliff, New South Wales, and Robert Hawkins Buchanan and Djoeriaman Oedjoe, Kensington, New South Wales, Australia, assignors to Unisearch Limited, Kensington, New South Wales, Australia, a corporation of New South Wales
Filed Feb. 20, 1962, Ser. No. 174,466
Claims priority, application Australia, Feb. 24, 1961, 1,869/61
4 Claims. (Cl. 302—14)

This invention has been devised to provide a hydraulic apparatus which will feed discrete solids from a pressurized chamber into a conveyor pipe line and discharge the same at a determined distant location. More particularly, but without limitation thereto, the invention has been devised to provide a hydraulic apparatus to convey coal or ore of large particle sizes from an underground mine to a hopper above the ground or directly into a ship's bunker or hold, or to a receiving station above or below the ground.

The hydraulic conveying of discrete solids of small particle size in pipelines is well known in respect of transferring solids from one point to another. This is usually performed by passing the conveying liquid and entrained solids through pumps designed for such purposes. The limitations of pumps capable of pumping large discrete particles, are such as to make pumps impracticable as a means of hydraulic conveying discrete solids of large particle size, as will be defined herein.

Numerous apparatuses have been devised for the purpose of introducing discrete solids into a pressurized conveying pipe line without passing the solids through a pump. These apparatuses rely upon the employment of one or more of the following methods to produce a flow of discrete solids into a pressurized conveying pipe line namely:

(a) The method which utilises mechanical devices to force solids out of a chamber and through a fixed aperture into a conveying pipe line. Notable amongst these devices are screw feeders, reciprocating feeders, rotating feeders, rotating valves, piston valves and the like.

(b) The method which utilises solely the force of gravity to drop the discrete solids out of a chamber through an aperture into a conveying pipe line.

(c) The method which combines (a) and (b).

(d) Another known apparatus for introducing finely divided discrete solids into a hydraulic conveying line utilises the pressure differential created by a high velocity stream jetting into a conveyor line to draw the surrounding liquid and contained solids from a chamber into the stream entering the conveyor line. The high velocity jet impinges into the surrounding liquid and forces it and the contained solids into the conveying cone of a venturi fitted to the inlet of the conveyor line. This cone directs the combined fluids and any entrained solids towards the throat of the venturi and causes the average stream velocity to increase as the throat is approached with corresponding decrease in stream pressure. The resultant pressure gradient to the jet produces the entrainment of external liquid and solids. Limitations of this apparatus are: (a) the mechanical efficiency of the unit is of the order of 30% and the practical pressure differential is of the order of 30–40 p.s.i.; (b) the size of the solids which may be entrained is severely limited by the essential relatively small diameter of the venturi throat; (c) the geometry of the apparatus is fixed between rigid limits if it is to attain a maximum pressure differential, and in practice it is not feasible to alter this geometry to vary the solids-liquid ratio.

(e) A further known apparatus for introducing finely divided discrete particles into a hydraulic conveying line employs a closed chamber into which is inserted a vertical or near vertical conveying pipe line such that the conveying pipe line terminates near the internal base of the chamber. Sufficient pressure is applied through an aperture in the top of the chamber to produce flow of any contained liquid and finely divided solids out of the chamber and through the conveying pipe line in this apparatus. Large discrete particles bridge across the entrance into the conveying pipe line and interrupt or prevent the flow of solids out of the conveyor.

Where the conveying of discrete solids of large particle sizes is required the principal problems are (a) to entrain such solids at constant and controlled rates and at constant and controlled solids-liquid ratios into a pressurized pipeline; (b) to entrain and convey such solids with minimum expenditure of energy and cost; (c) to entrain such solids with minimum particle size degradation and apparatus wear and tear; (d) to be capable of operating under conditions of very high pressure for example, of the order of 1500 to 2000 pounds to the square inch. The method and apparatus of the present invention solves these problems in a practical and useful manner.

One advantage of hydraulic conveying of discrete solids of large particle sizes is that subsequent extractions of the solids from the conveying liquid and removal of said liquid adhering to such solids is relatively simple and inexpensive as compared with the same process on finely divided solids.

In the following description the terms "vertical" and "horizontal" shall be deemed to include slopes at such angles as are encountered in mining and industry in elevating and conveying discrete solids. The term "large particle size" means discrete solids of up to the order of 24 inches.

The present invention consists of entraining discrete solids contained in a pressurized chamber into the inlet to a conveyor pipe line by passing a liquid current in an upward direction through the chamber and with the liquid under the pressure and velocity required to convey the discrete solids through such pipe line.

In the case of vertical lifts, the velocity required in the conveying liquid, is achieved by pumping means (preferably but not necessarily) at the top of the lift. In the case of horizontal conveying the velocity in the conveying liquid is achieved by pumping means and for long conveyors booster units are incorporated at intermediate points to compensate for frictional losses. Intermediate units are also utilised where required to alter or restore controlled solids-liquid ratios.

The apparatus for carrying the invention into effect consists of a single closed chamber or interconnected chambers to receive discrete solids, a conveyor pipe line having an inlet in one chamber with at least the part of the pipe extending from the inlet located vertically, said chamber being capable of being pressurized, a liquid supply pipe having its delivery juxtaposed with relation to the conveyor pipe inlet and means to create a high velocity flow of liquid in the entrainment chamber between the conveyor pipe inlet and liquid supply pipe outlet therein. Where two or more chambers are incorporated, one is an entrainment chamber which is pressurized as aforesaid and the other or others are filling chambers. The filling chamber or chambers may also be arranged to be pressurized.

Discrete solids in the entrainment chamber, having the conveyor pipe inlet and the liquid delivery pipe outlet therein discharge from the bed of solids contained in the entrainment chamber and move, by force of gravity assisted by turbulence caused by the liquid current passing between the liquid delivery pipe and the conveyor pipe, into a region of low solids-liquid ratio surrounding the extremities of the two pipes. These disengaged solids travel toward the axial centre line of the pipes in a downward trajectory and are drawn into the liquid current and entrained upwards into the inlet of the conveyor pipe by the following combined forces: (a) kinetic energy imparted to the solid by impact from the moving liquid stream and suspended solids; (b) Bernoulli forces due to the velocity gradient across the liquid stream; (c) impact and deflection against the downward flowing solid bed and surrounding vessel surfaces; (d) density difference between the solid and the liquid. In batch operation there is no net volume displacement in the pressurized chamber, only substitution of liquid for the discrete solids therein.

Means may be incorporated whereby the ratio of discrete solids to liquid in the conveyor pipe can be varied before operating and/or while in operation from zero to a maximum of the order of sixty percent by volume. For this purpose a moveable sleeve is fitted to the inlet of the conveyor pipe and/or to the outlet of the liquid supply pipe such that the length of the entrainment zone in the entrainment chamber can be adjusted to vary the solid-liquid ratio or to isolate the chamber and to enable its depressurization. Additionally, means may be incorporated to regulate the rate of liquid flow from the liquid delivery pipe to vary the solid-liquid ratio or the solid entrainment ratio.

The invention will now be described with reference to the annexed drawings, wherein:

FIG. 1 is a diagrammatic layout of a batch apparatus designed to lift coal vertically.

FIG. 2 is a view similar to FIG. 1 showing how two inter-connecting chambers can be incorporated as filling and entrainment chambers respectively to provide discrete solids for a substantially continuous lifting operation. It also includes a showing of a third valve at the top of the filling chamber.

Figure 3:
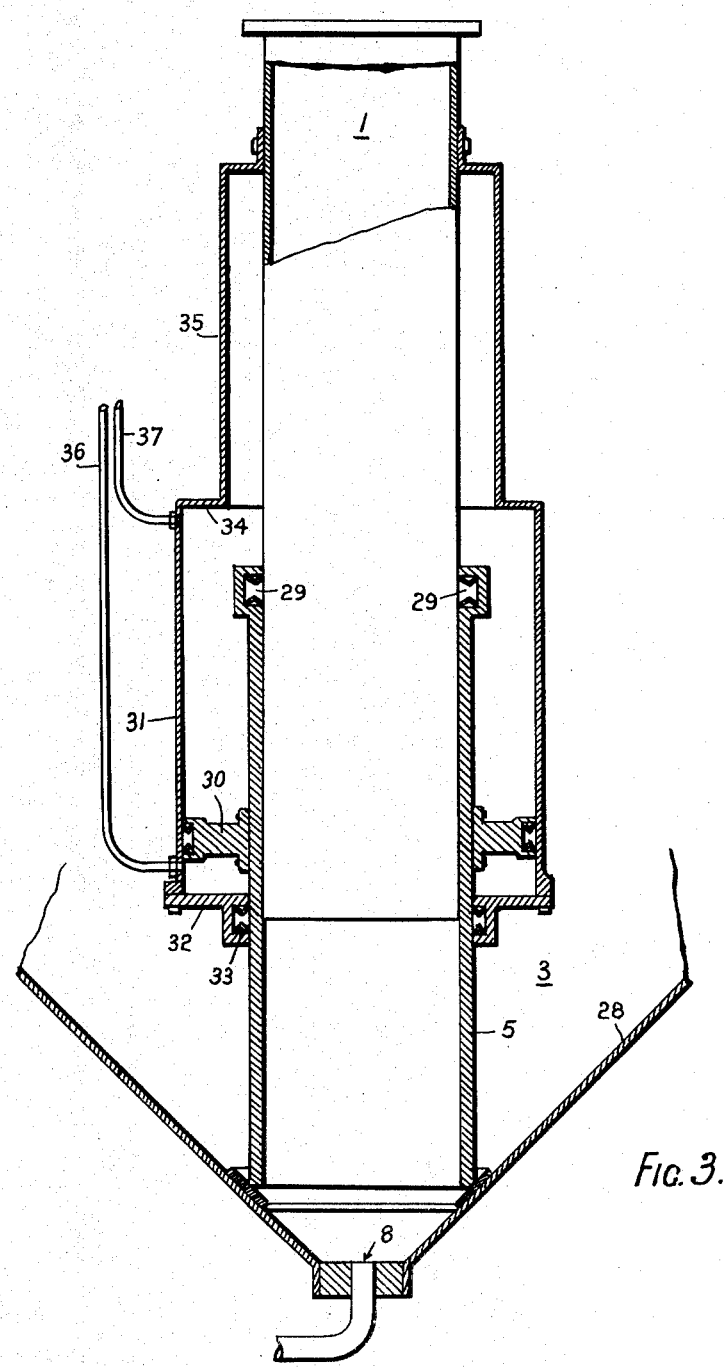
FIG. 3 is a schematic central sectional elevation of part of the entrainment chamber and conveyor pipe with a first slide valve on the pipe, and actuating means therefor.

In the following description FIG. 1 is referred to as an apparatus designed to lift 300 tons of coal of a particle size of up to the order of 6 inches, 1,000 feet in one hour. It is to be understood that the figures and sizes given are by way of example only and the invention is not limited thereto.

In this example the conveyor pipe 1 is 18 inches in diameter. It extends from a discharge position 2 at the top into a chamber 3. The chamber is 20 feet in diameter and 55 feet in height, i.e. capable of holding a batch of 300 tons. The chamber 3 has a coal receiving inlet which can be sealed by valve 4 and the chamber pressurized. The conveyor pipe 1 terminates 6 feet above the bottom of chamber 3 and a first sleeve valve 5 slidable on the pipe 1 can be moved to seat on the bottom of the chamber and thus seal off the chamber for the purpose of depressurizing and charging the same with coal. A liquid delivery pipe 6 of 12 inches diameter, extends from the elevated position where it is connected to the delivery of a 250 H.P. pump 7. The outlet 8 of the pressure liquid delivery pipe 6 is connected into the bottom of the chamber 3 in axial alignment with the inlet to the pipe 1. The outlet 8 may have a nozzle thereon. The operating pressure at the pump outlet 7 is of the order of 100 to 150 pounds per square inch and in the chamber 3 is of the order of 550 to 600 pounds per square inch and the velocity of liquid charged coal passing through the conveyor pipe 1 is maintained in the range of 5 to 7 feet per second. The solid "pulp" density, that is the gravimetric ratio of the weight of solids divided by the sum of the weights of coal and liquid conveyed, is of the order of 30–35 percent. FIG. 1 also shows how coal or coal and liquid can be fed by duct 9 to the chamber 3.

FIG. 2 shows how a filling chamber 10 can be interposed between the chamber 3 and the duct 9. This filling chamber also has a third valve 4 to seal the coal or coal and liquid receiving inlet. Where two such chambers are incorporated, the chamber 10 can be filled with solids plus intersticial liquid while discrete solids and liquid are discharged from chamber 3 into the conveyor pipe 1 and then the contents of chamber 10 can be transferred to chamber 3 as soon as chamber 3 is de-pressurized. A more continuous flow of solids can thus be maintained in the conveyor pipe.

Figure 4:
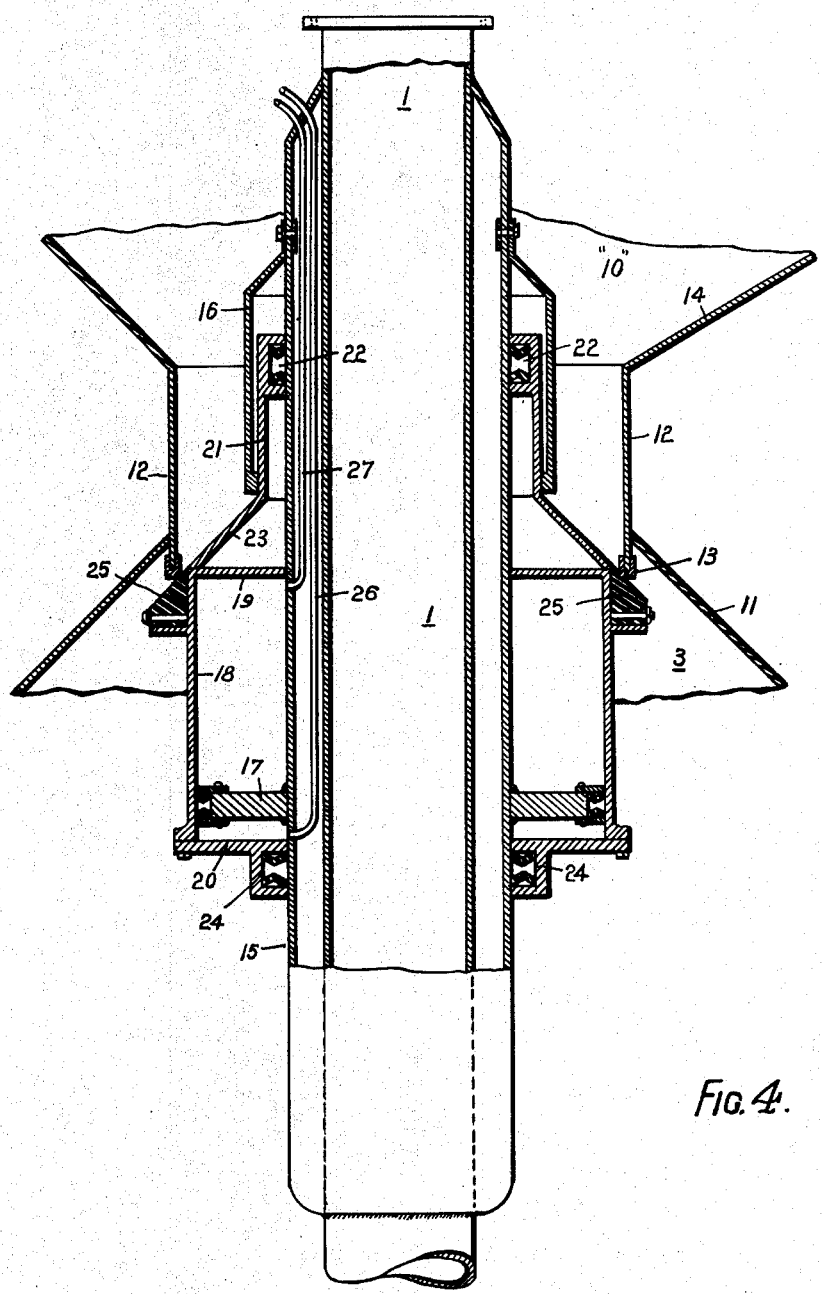
FIG. 4 is a schematic central sectional elevation of a part of a chamber and conveyor pipe, a second valve to close the chamber and actuating means therefor.

FIG. 4 shows one form of a second valve 4 which can be used to seal the chamber 3 from the chamber 10, or other filling device. The upper part of the chamber 3 converges inwardly as at 11 and connected to a cylindrical neck 12. The neck projects into the chamber 3 and has a valve seat 13 formed on the end thereof. The upper end of the neck 12 is connected to a diverging funnel inlet 14 which may be the outlet from the duct 9 or the bottom of a filling chamber 10.

A guide sleeve 15 is fixed to the conveyor pipe 1 and forms therewith an annular cavity. A second sleeve 16 in the form of a hood is fixed to the conveyor pipe 1 above the guide sleeve 15. A piston 17 is fixed to the guide sleeve 15 and a slidable cylinder 18 having annular end covers 19–20 is mounted over the piston 17. A cylindrical guide 21 slidable in the sleeve 16 has a slide 22 in engagement with the fixed guide sleeve 15. The lower part of the guide 21 is tapered outwardly as at 23 and the end is fixed to the end cover 19. This arrangement provides, when the valve is opened, an annular entrance to chamber 3 of substantial proportions for the rapid delivery of discrete solids to chamber 3. The end cover 20 has a slide 24 in engagement with the guide sleeve 15. The slides 22 and 24 each incorporate a sealing gland. A valve 25 is fixed to the cylinder 18 in juxtaposition to the valve seat 13. The valve 25 is moved onto and off its seat by hydraulic pressure applied to the piston 17 through pipes 26 and 27.

FIG. 3 shows one form of actuating means for a sleeve valve whereby the chamber 3 can be cut-off from the conveyor pipe 1 and the liquid delivery pipe 6, in order to de-pressurize the chamber 3 for the purpose of filling it with discrete solids and also whereby the sleeve valve can be set to regulate the volume of discrete solids entering the conveyor pipe 1.

In this embodiment (FIG. 4), the converging bottom of the chamber 3 is indicated at 28. The movable sleeve 5 has a slide 29 in engagement with the stationary conveyor pipe 1 and a piston 30 is fixed to the sleeve. A cylinder 31 is fixedly mounted over the piston 30; it has an annular end cover 32 at the bottom in engagement with the sleeve 5 and a gland 33 is incorporated in the cover. At the top the cylinder has an inset flange 34 which is connected to an upwardly projection sleeve 35. The top of the sleeve 35 is fixed to the conveyor pipe 1. The diameter and length of the sleeve 35 is such that the sleeve 5 can be accommodated within it up to the position of the piston 30. The sleeve is moved by hydraulic pressure applied to the piston 30 through pipes 36 and 37.

Apparatus as described above can be used for horizontal conveying as from a stock pile. For conveying over long distances horizontally, a booster or a number of boosters is or are incorporated in the conveyor line and they may also be incorporated in vertical conveyor lines as well.

Figures 5, 6:
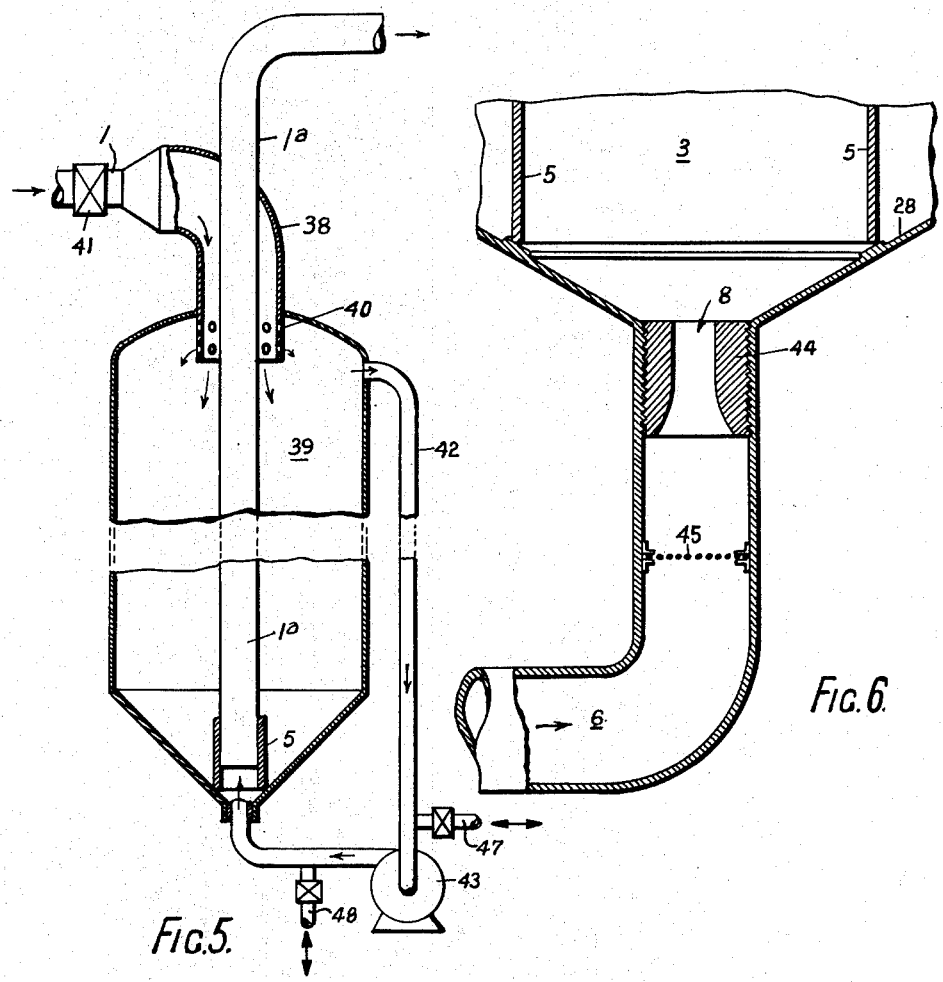
FIG. 5 is a diagrammatic layout of a booster unit for long horizontal and/or vertical conveying pipe lines.
FIG. 6 is a schematic central sectional elevation of part of an entrainment chamber and delivery pipe incorporating a nozzle.

FIG. 5 illustrates one form of booster. The conveyor pipe 1 has an enlarged inlet 38 which is entered into the top of an additional pressure chamber 39. The part in the chamber may have holes in the wall as indicated at 40 and a valve may be incorporated in the pipe adjacent the inlet as indicated at 41. The continuation 1a of the conveyor pipe is entered into the chamber 39 through the enlarged inlet 38 and its end is in the same relative position to the bottom of the chamber as described with reference to chamber 3. A liquid velocity creating pipe 42 has its inlet connected into the chamber 39 adjacent the top and its outlet connected into the bottom of the chamber in juxtaposition to the inlet to the conveyor pipe 1a. A pump 43 is conneced into the pipe 42. The apparatus shown in FIG. 5 can also be used for altering the solid-liquid ratio in the conveying system. By adding fresh liquid or withdrawing liquid entering pump 43, by valved lateral pipe connections 47, 48, a different slurry ratio can be produced.

FIG. 6 shows how a nozzle may be incorporated in the outlet 8 of the liquid delivery pipes 6 and 42. The nozzle is in the form of a sleeve 44 which is screwed into the end of the respective pipes. A screen may also be incorporated in the pipes upstream of the nozzle as indicated at 45.

Although the pipes 1 and 6 are shown in spaced relationship, they may be located one within the other. In this modification not illustrated both pipes would enter through the top of the entrainment chamber and extend downwards toward the lower section of the entrainment chamber. Solids may be conveyed upwards through the inner pipe or upwards through the annulus formed between the inner and outer pipes. It will be appreciated that in this arrangement the diameters of the pipes 1 and 6 will be proportioned to provide the required cross sectional area in the conveyor pipe.

The present invention envisages that the chamber be installed directly against the walls of a cut out of the earth thus permitting the chamber to withstand very high pressures. Where this is not practical an elevated pressure chamber would be constructed to withstand the required pressure.

The principal advantages of the invention described herein are as follows:

(a) The cost of installing and operating the hydraulic apparatus described herein, by comparison with conventional mechanical conveying, is very much in favour of hydraulic conveying.

(b) The maximum size of discrete solids which can be elevated hydraulically by the present invention is equal to the average size of solids produced normally by modern mining methods. Additionally the apparatus can be constructed so that the tonnage rate at which such solids may be elevated hydraulically can conform to the production rate of the mine to which it is applied.

(c) The invention permits control of the solids-liquid conveying ratio, within close tolerance, over a range of zero to 60% by weight of solids to liquid. This "conveying ratio" corresponds to a gravimetric percentage pulp density of one hundred times sixty divided by one hundred plus sixty or 37.5%.

We claim:
1. Apparatus for hydraulically entraining and conveying discrete solid material comprising;
 (1) a vertical axis cylindrical entrainment chamber converging at each end, and being imperforate except for a coaxial bottom opening and a coaxial top opening,
 (2) an upwardly directed material conveyor pipe coaxially stationed within the chamber and passing vertically beyond the top of said chamber and provided with a constant diameter slidable sleeve valve at its lower inlet end, said sleeve being of an inside diameter greater than the diameter of said bottom opening, and including means to selectively move said sleeve from a lowered position sealing off the lower opening from the chamber to a higher position to regulate the volume of discrete solid material capable of flowing into said inlet end of said conveyor pipe,
 (3) the chamber top opening above the convergence formed with a cylindrical neck and a downwardly converging solid material collector thereabove,
 (4) a second slidable sleeve valve mounted on said conveyor pipe adjacent said top opening and cylindrical neck and including an upper portion of less diameter than said neck and an integral lower portion of greater diameter than said neck and including means to selectively move said valve from an upper closed position contacting said chamber interior to a lower open position providing an annular clearance with the adjacent chamber interior,
 (5) a liquid supply pipe connected to the chamber at its bottom opening and having an axial delivery end upwardly directed towards the conveyor pipe inlet,
 (6) and high pressure pump means directly connected to said liquid supply pipe,
 (7) whereby discrete solids and liquid may be admitted from above into the chamber to fill the same, the second valve may be closed, the first valve may be elevated from its seated position, the pump may supply liquid into the base of the chamber through the liquid supply pipe; the tank becomes pressurized, a high velocity liquid flow is established between the liquid supply pipe and the conveyor pipe line, and discrete material and liquid are entrained upwardly within said conveyor pipe to elevations considerably above the top of said chamber.

2. The apparatus of claim 1 wherein;
 (1) a portion of the conveyor pipe passing vertically beyond the top of said chamber is surrounded by a filling chamber,
 (2) said filling chamber being cylindrical and converging at each end, and being imperforate except for a coaxial bottom opening and a coaxial top opening, the bottom of said latter chamber having an opening connected to the downwardly converging solid material collector of said entrainment chamber,
 (3) a third slidable sleeve valve mounted on said conveyor pipe adjacent the top opening of said filling chamber, the structure of said valve and the adjacent top filling chamber structure being similar to the structure of said second valve and the neck of said entrainment chamber,
 (4) whereby by individual selective manipulation of said pump and said second and third valves, the filling chamber may be filled while the entrainment chamber is discharging, the charge in the filling chamber may then be allowed to fall into the entrainment chamber, and the refilled entrainment chamber may be discharged while the filling chamber is being refilled.

3. The apparatus of claim 1 wherein
 (1) the portion of the conveyor pipe passing vertically beyond the top opening of the entrainment chamber is directed horizontally towards the inlet of an additional pressurized entrainment chamber, wherein the energy of the conveyed stream of liquid and solids is augmented and the liquid content of said stream may be altered,
 (2) said additional chamber including a shell converging at top and bottom and having only axial top and bottom openings and a top side wall opening, an axially downwardly discharging material and liquid pipe, connected through a valve to said horizontally directed conveyor pipe and passing through said latter top opening and terminating slightly therebelow,
 (3) a second vertical conveyor pipe axially within the shell with an adjustable height inlet and extending upwardly and concentrically within said material and liquid discharge pipe, and then passing upwardly through a side wall of the latter discharge pipe, and then leading to a desired destination, (4) a pipe loop exterior of said shell including a suction pipe connection from said top side wall opening, a discharge pipe connection leading into said latter bottom opening, (5) a high pressure pump between said connections, and valved lateral pipe connections entering parts of said loop to add fresh liquid to the loop contents, or to drain excess liquid from said loop contents.

4. The structure of claim 3 wherein said discharge pipe connection leading into the bottom of the shell includes a nozzle adjustably screwed within said pipe adjacent said lower opening, and a screen within said pipe at a spaced distance upstream of said nozzle.

References Cited by the Examiner
UNITED STATES PATENTS

| | | | |
|---|---|---|---|
| 138,175 | 4/73 | Merrill | 302—23 |
| 496,684 | 5/93 | Griscom | 302—14 |
| 528,417 | 10/94 | Duckliam | 302—53 |
| 2,793,082 | 5/57 | Gardner | 302—14 |

SAMUEL F. COLEMAN, *Primary Examiner.*

ANDRES H. NIELSEN, ERNEST A. FALLER, Jr., *Examiners.*